(12) United States Patent
Balensiefer (10) Patent No.: US 7,246,852 B2
(45) Date of Patent: Jul. 24, 2007

(54) HEADREST ACTUATOR FOR JUVENILE VEHICLE SEAT

(75) Inventor: Eugene Balensiefer, Seymour, IN (US)

(73) Assignee: Cosco Management, Inc., Wilmington, DE (US)

( * ) Notice: Subject to any disclaimer, the term of this patent is extended or adjusted under 35 U.S.C. 154(b) by 421 days.

(21) Appl. No.: 10/797,281

(22) Filed: Mar. 10, 2004

(65) Prior Publication Data

US 2005/0200177 A1 Sep. 15, 2005

(51) Int. Cl.
A47C 1/11 (2006.01)

(52) U.S. Cl. .............................. 297/250.1; 297/256.1; 297/256.11; 297/410

(58) Field of Classification Search ............. 297/250.1, 297/256.1, 256.11, 410, 353
See application file for complete search history.

(56) References Cited

U.S. PATENT DOCUMENTS

| | | |
|---|---|---|
| 3,265,437 A | 8/1966 | Mincieli |
| 3,910,634 A | 10/1975 | Morris |
| 4,040,664 A | 8/1977 | Tanaka et al. |
| 4,047,755 A | 9/1977 | McDonald et al. |
| 4,342,483 A | 8/1982 | Takada |
| 4,376,551 A | 3/1983 | Cone |
| 4,545,617 A | 10/1985 | Drexler et al. |
| 4,632,456 A | 12/1986 | Kassai |
| 4,709,960 A | 12/1987 | Launes |
| 4,790,601 A | 12/1988 | Burleigh et al. |
| 4,854,639 A | 8/1989 | Burleigh et al. |
| 4,858,997 A | 8/1989 | Shubin |
| 4,915,446 A | 4/1990 | Darling et al. |
| 5,082,325 A | 1/1992 | Sedlack |
| 5,106,158 A | 4/1992 | Dukatz et al. |
| 5,181,761 A | 1/1993 | Meeker |
| 5,335,964 A | 8/1994 | Sedlack et al. |
| 5,344,213 A | 9/1994 | Koyanagi |

(Continued)

FOREIGN PATENT DOCUMENTS

DE 3536206 A1 4/1987

(Continued)

OTHER PUBLICATIONS

Graco® Website, 2 pages, dated Jun. 9, 2004, entitled TurboBooster® 8674PRN, www.gracobaby.com.

(Continued)

*Primary Examiner*—David R. Dunn
*Assistant Examiner*—Noah Chandler Hawk
(74) *Attorney, Agent, or Firm*—Barnes & Thornburg LLP (57) ABSTRACT

A juvenile seat includes a base having a bottom seat portion, a lower back section coupled to the base and positioned to lie at an angle relative to the bottom seat portion, and a headrest coupled to the lower back section for up and down movement relative to the base and the lower back section. The juvenile seat also includes a height-adjustment mechanism coupled to the headrest for up and down movement with the headrest to adjust the height of the headrest above the bottom seat portion. The height-adjustment mechanism is movable between a locked position to prevent up and down movement of the headrest relative to the lower back section and an unlocked position to permit up and down movement of the headrest relative to the lower back section.

28 Claims, 8 Drawing Sheets

U.S. PATENT DOCUMENTS

| | | | |
|---|---|---|---|
| 5,468,046 A | 11/1995 | Weber et al. | |
| 5,527,094 A | 6/1996 | Hiramatsu et al. | |
| 5,580,126 A | 12/1996 | Sedlack | |
| 5,775,772 A | 7/1998 | Lefranc | |
| D413,026 S | 8/1999 | Reithmeier | |
| 6,030,047 A | 2/2000 | Kain | |
| 6,135,553 A | 10/2000 | Lovie et al. | |
| 6,139,100 A | 10/2000 | Baskin-Lockman et al. | |
| 6,155,638 A | 12/2000 | Bapst | |
| 6,189,970 B1 | 2/2001 | Rosko | |
| 6,273,509 B1 | 8/2001 | Reithmeier et al. | |
| 6,378,950 B1 | 4/2002 | Takamizu et al. | |
| D461,320 S | 8/2002 | Sher | |
| 6,428,099 B1 | 8/2002 | Kain | |
| 6,464,294 B1 | 10/2002 | Kain | |
| 6,481,794 B1 | 11/2002 | Kassai et al. | |
| 6,485,101 B2 | 11/2002 | Kassai et al. | |
| 6,491,348 B1 | 12/2002 | Kain | |
| 6,547,333 B2 | 4/2003 | Parenteau et al. | |
| 6,623,074 B2 | 9/2003 | Asbach et al. | |
| 6,626,493 B2 * | 9/2003 | Kain | 297/250.1 |
| 6,659,564 B2 | 12/2003 | Kassai et al. | |
| 6,779,843 B2 * | 8/2004 | Kain | 297/250.1 |
| 6,820,939 B1 * | 11/2004 | Chen | 297/484 |
| 2001/0011838 A1 | 8/2001 | Kassai et al. | |
| 2002/0145318 A1 | 10/2002 | Asbach et al. | |
| 2002/0195867 A1 | 12/2002 | Barger et al. | |
| 2004/0124676 A1 * | 7/2004 | Kain | 297/250.1 |
| 2004/0124677 A1 * | 7/2004 | Meeker et al. | 297/255 |
| 2004/0124678 A1 | 7/2004 | Williams et al. | |
| 2005/0212342 A1 * | 9/2005 | Kain et al. | 297/410 |

FOREIGN PATENT DOCUMENTS

| | | |
|---|---|---|
| EP | 576847 A2 | 1/1994 |
| EP | 1 084 900 A2 | 3/2003 |
| GB | 2 282 32 1 | 4/1995 |

OTHER PUBLICATIONS

Britex USA Website, 1 page, dated Jun. 9, 2004, entitled Starriser Comfy, www.britaxusa.com.

Britex USA Website, 2 pages, dated Jun. 9, 2004, entitled Bodyguard booster with Side Impact Protection, www.britaxusa.com.

Britex USA Website, 1 page, dated Jun. 9, 2004, entitled Roadster, www.britaxusa.com.

* cited by examiner

HEADREST ACTUATOR FOR JUVENILE VEHICLE SEAT

BACKGROUND

The present disclosure relates to seats for use by children in vehicles, and particularly, to booster seats having a back portion including a headrest. More particularly, the present disclosure relates to a juvenile booster seat having an apparatus for raising and lowering the headrest portion of the juvenile booster seat.

Many juvenile booster seats are formed to include a headrest which adjusts upwardly and downwardly relative to a bottom seat portion of the booster seat. Such a booster seat can be adapted by a user to seat children of different sizes.

SUMMARY

According to the present disclosure, a juvenile seat includes a base and a lower back section coupled to the base and positioned to lie at an angle relative to the base. A headrest of the juvenile seat is coupled to the lower back section for up and down movement relative to the base and the lower back section to accommodate small-and large-sized children therein. The headrest includes a back plate and first and second side wall portions coupled to the back plate.

The juvenile seat further includes a height-adjustment mechanism for adjusting a height of the headrest above the bottom seat portion. The height-adjustment mechanism includes an actuator coupled to either one of the first and second side wall portions of the headrest for up and down movement with the headrest. The actuator is movable between a locked position to prevent up and down movement of the headrest relative to the lower back section and an unlocked position to permit up and down movement of the headrest relative to the lower back section.

The height-adjustment mechanism further includes a height-adjustment bar coupled to the actuator and bar receivers provided in the lower back section. The height-adjustment bar engages one of the bar receivers in the locked position to secure the headrest at a desired height relative to the bottom seat portion. The height-adjustment mechanism is disengaged from the bar receivers in the unlocked position to permit a user to adjust the height of headrest above the bottom seat portion.

Features of the present disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIGS. 11–14 are rear perspective views of a portion of the booster sheet showing an "anti-backout" feature of the booster seat to prevent a user from unintentionally removing the headrest from the lower back section of the seat back when raising the headrest above the base;

DETAILED DESCRIPTION

Figures 7, 8:
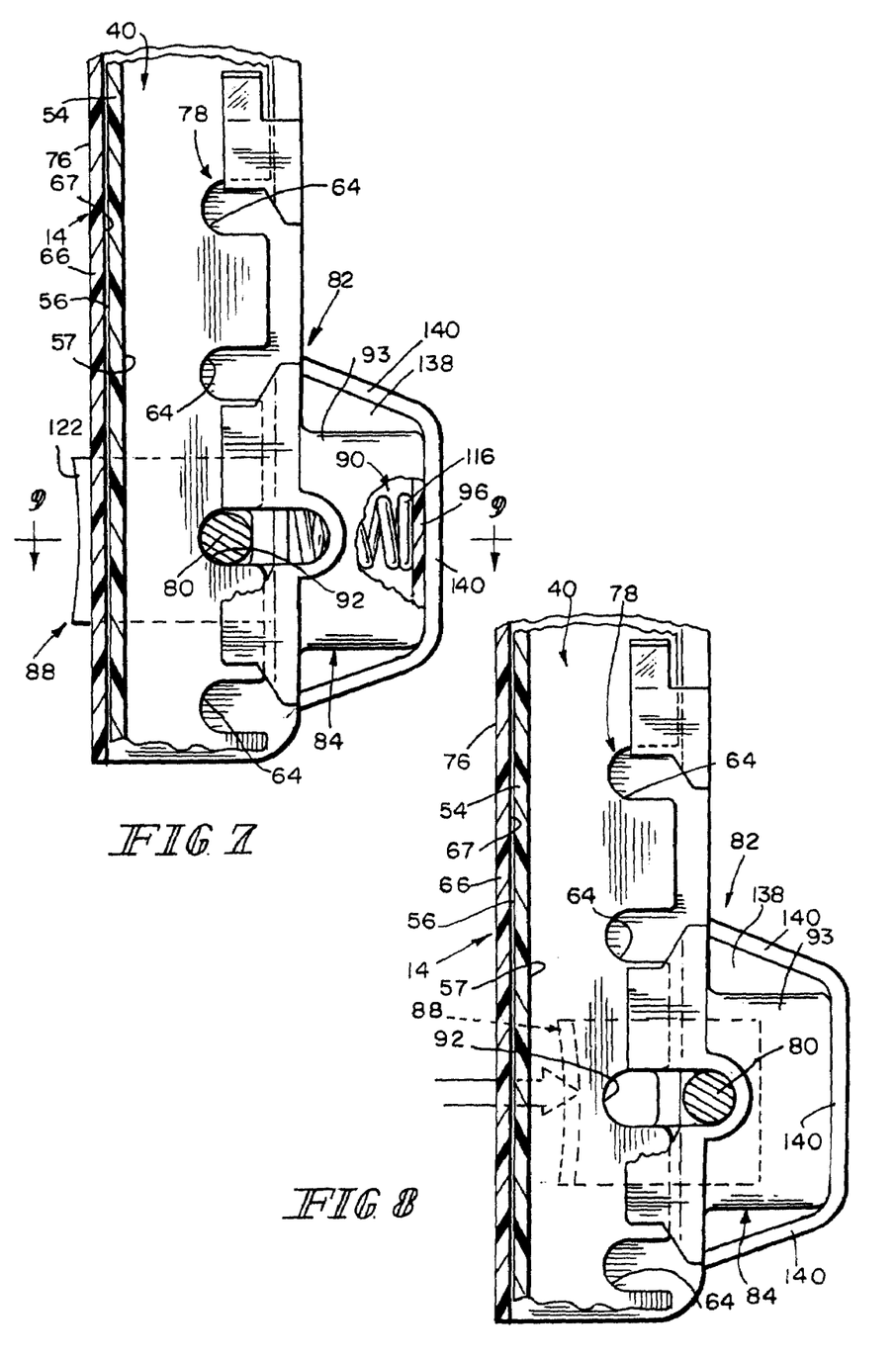
FIG. 7 is a side sectional view taken along line 7—7 of FIG. 1 showing the actuator of the height-adjustment mechanism in a "locked" position such that the height-adjustment bar is received within one of the slots of the lower back section of the seat back.
FIG. 8 is a side sectional view similar to FIG. 7 of the actuator in an "unlocked" position showing the push-button having been moved against the bias of the spring to the right in the direction of the arrow to move the height-adjustment bar out of engagement with the slots of the lower portion of the seat back.
Figure 10:
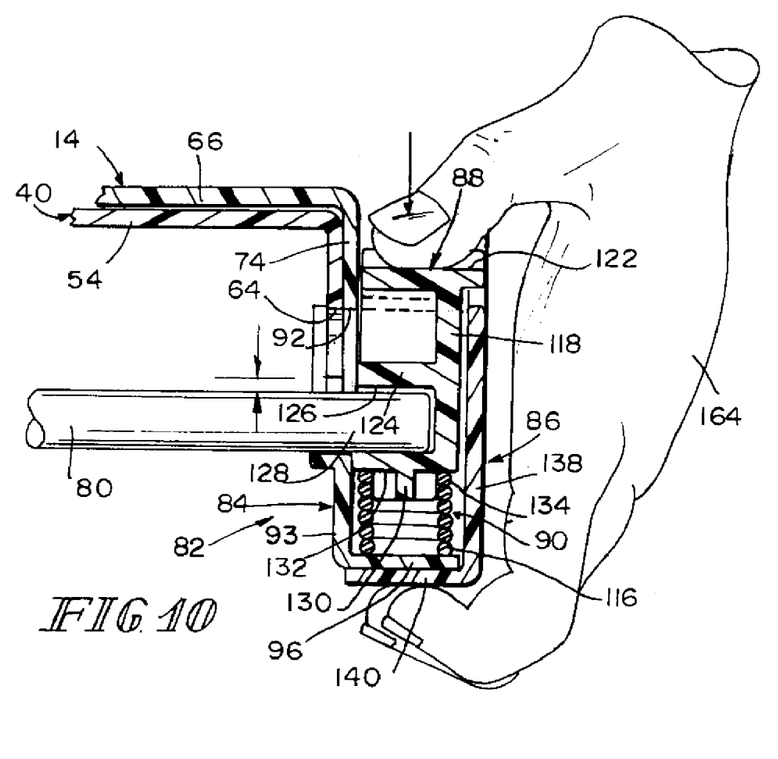
FIG. 10 is a sectional view similar to FIG. 9 showing a user having moved the push-button against the bias of the spring to an unlocked position where the height-adjustment bar coupled to the push-button is disengaged from the slots of the lower back section of the seat back.

A juvenile booster seat 10 is provided for supporting juveniles therein. Booster seat 10 may be coupled to a seat (not shown) within a vehicle (not shown), for example, to secure the juvenile within the vehicle. Although reference is made to a booster seat 10, it is within the scope of this disclosure to include juvenile vehicle seats or other such seats for supporting and securing juveniles within a vehicle. Booster seat 10 includes a height-adjustment mechanism or height-adjusting means 12 for adjusting the height of a headrest 14 of the seat 10 up and down relative to a base 16 of the seat 10 to accommodate small-and large-sized children therein. Headrest 14 can be moved relative to base 16 from a lowered position shown in FIG. 1 to a raised position shown in FIG. 2 by operating height-adjustment mechanism 12 as shown in FIGS. 8 and 10 to release a height-adjustment bar 80 coupled to headrest 14 from bar-receiving slots or notches 64 formed in a stationary, lower back section 40 coupled to base 16.

Figures 1, 2:
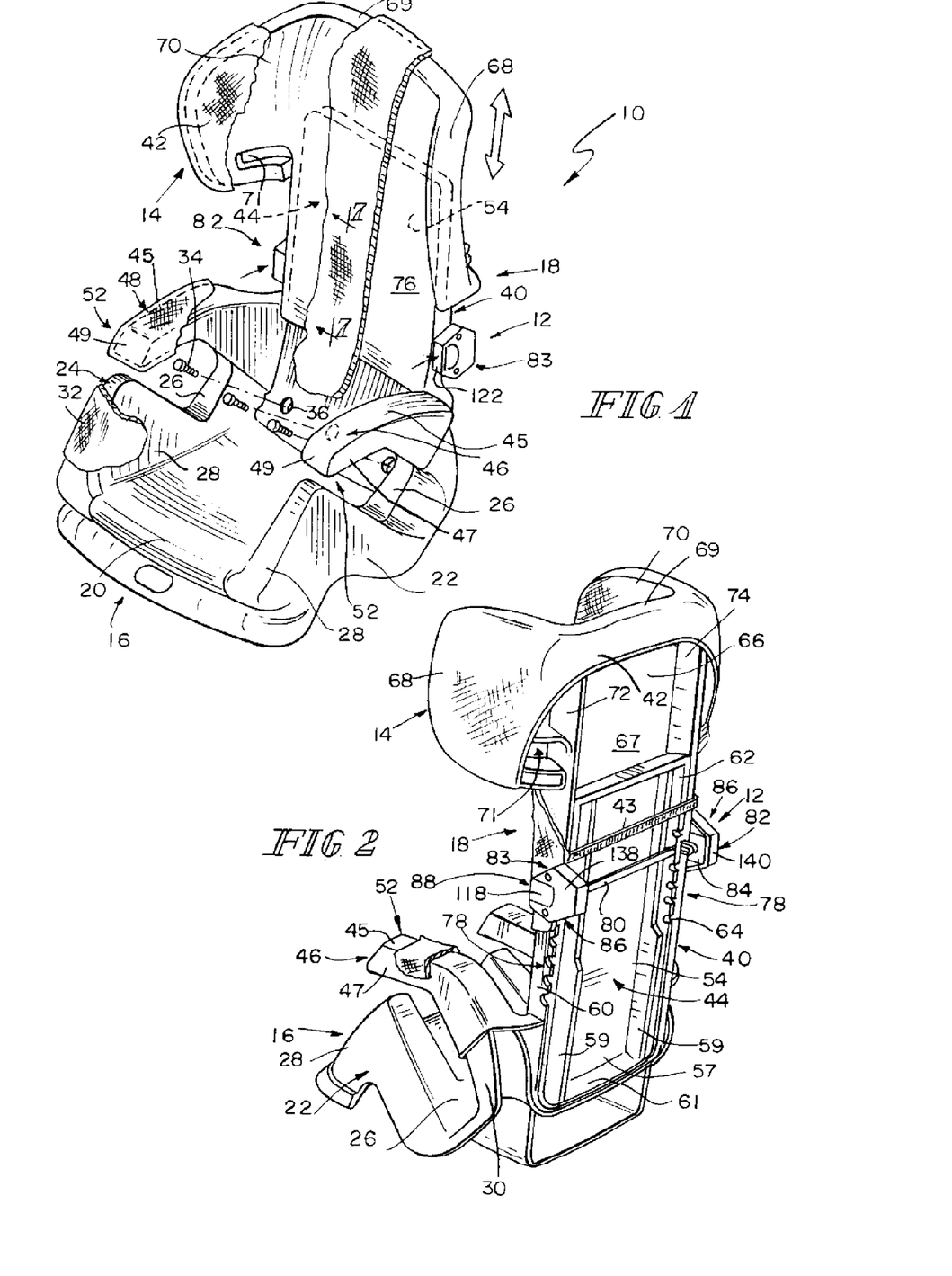
FIG. 1 is a front perspective view of a juvenile booster seat of the present disclosure showing a base and a seat back coupled to the base and including a headrest located in a lowered position relative to the base and arranged to move up and down relative to the base to adjust the height of the headrest above a bottom seat portion of the base.
FIG. 2 is a rear perspective view of the booster seat showing the headrest located in a raised position relative to the base and showing a height-adjustment mechanism coupled to a rear portion of the seat back for moving the headrest up and down relative to the base.

As shown in FIG. 1, booster seat 10 includes base 16 and a seat back 18 coupled to base 16. Base 16 includes a bottom seat portion 20 adapted to support a juvenile's bottom and upper legs thereon, and a pair of side walls 22, 24 coupled to the bottom seat portion 20. First and second side walls 22, 24 are provided for preventing lateral movement of the juvenile seated in seat 10 and are located on opposite sides of bottom seat portion 20. Seat back 18 includes a stationary, lower back section 40 coupled to base 16 and a headrest 14 mounted for up-and-down movement on lower back section 40.

A notch 26 is formed in each side wall 22, 24 for receiving portion of a seat belt (not shown) of the vehicle (not shown) therethrough to position a portion of the seat belt over a juvenile's lap, for example, when the juvenile is seated on bottom seat portion 20. Notches 26 act to define a front portion 28 of each side wall 22, 24 and a rear portion 30 of each side wall 22, 24. As is discussed in greater detail below, the rear portion 30 of each side wall acts as a lower back mounting section of the base 16 and is formed to receive a portion of the seat back 18 thereon. A cushion or booster seat cover 32 is provided for covering the base 16.

Seat back 18 of booster seat 10 is coupled to base 16 and positioned to lie at an angle to bottom seat portion 20 to extend upward from base 16 generally perpendicularly to bottom seat portion 20. Seat back 18 is coupled to base 16 by screws 34 received through corresponding apertures 36 located at a bottom portion of seat back 18 and into corresponding apertures 38 of base 16. Seat back 18 includes a lower, stationary back section 40 and an upper, movable section or headrest 14 coupled to lower back section 40 for up and down movement relative to lower back section 40 to adjust an overall height of seat back 18 above bottom seat portion 20.

Figure 3:
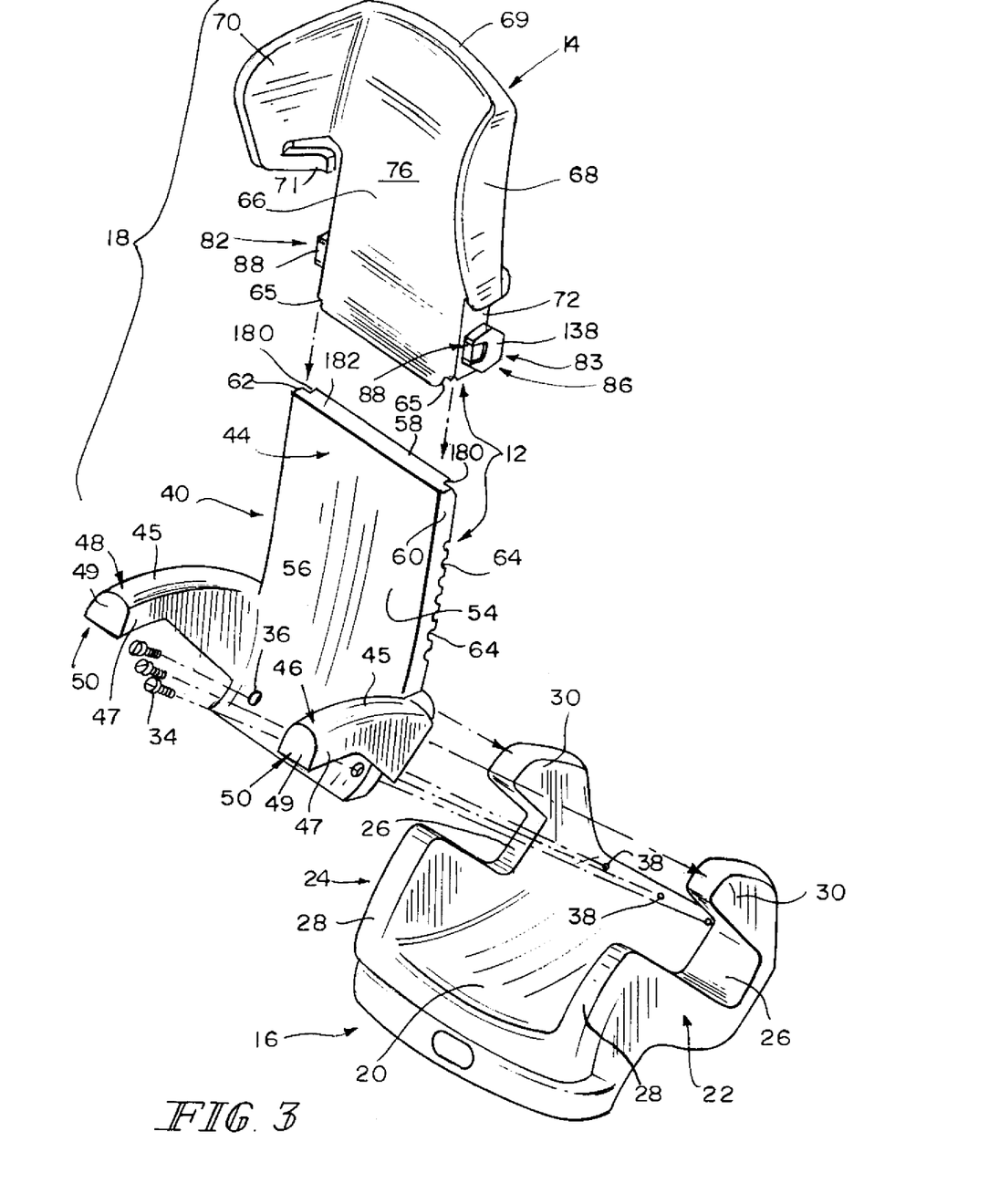
FIG. 3 is a front, exploded, perspective view of the booster seat of FIGS. 1 and 2 showing the base, seat back, and headrest, the headrest being coupled to a lower back section of the seat back for up and down movement relative to the base and the lower back section.
Figure 4:
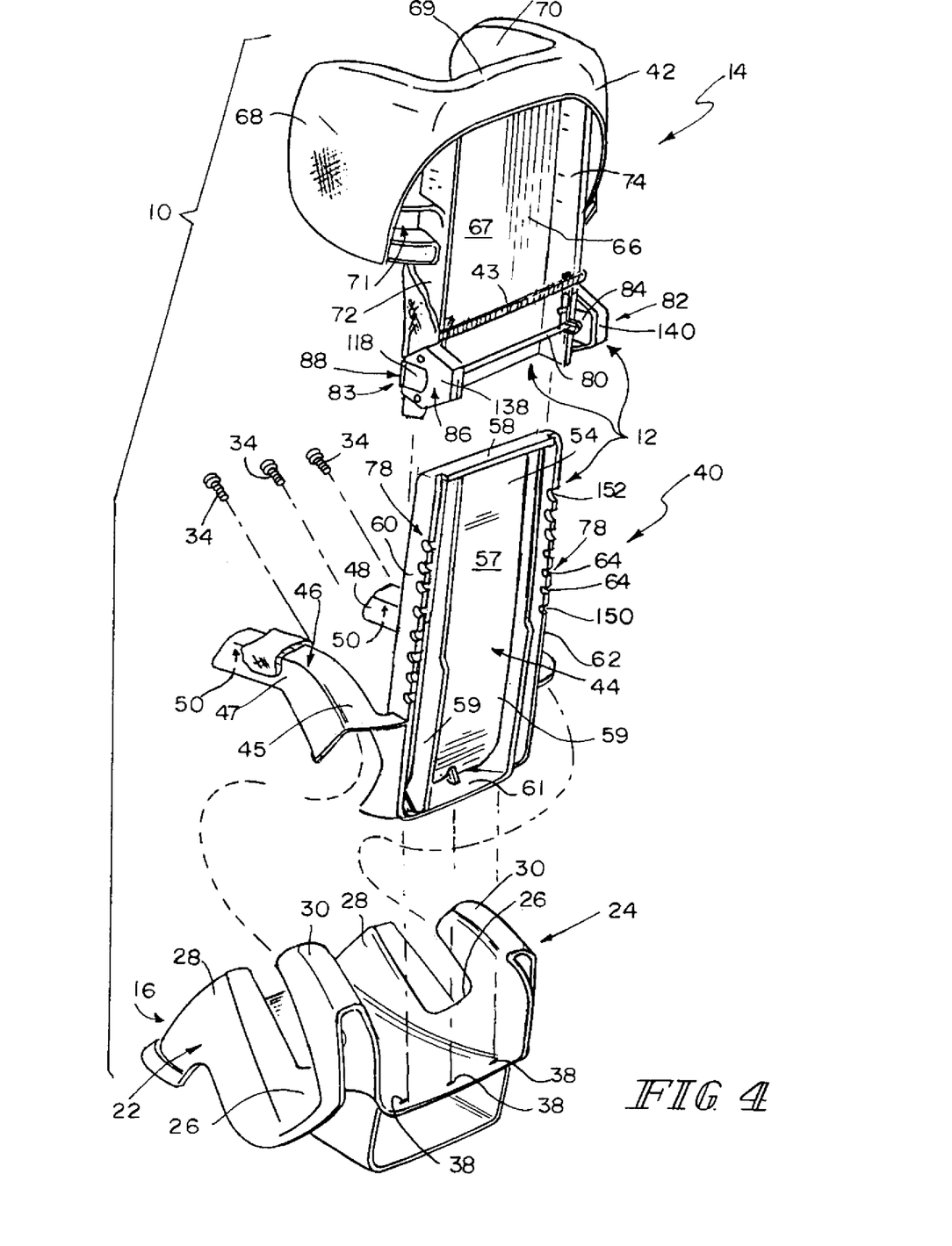
FIG. 4 is a rear perspective, exploded view of the booster seat of FIGS. 1 and 2 showing the headrest height-adjustment mechanism coupled to the headrest and vertically spaced-apart slots formed in the lower back section to mate with the headrest height-adjustment mechanism as suggested in FIGS. 7–10.

As shown in FIGS. 3 and 4, lower back section 40 of seat back 18 includes a vertical, planar body 44 and a pair of armrest shells 46, 48 each coupled to body 44 at a lower end of body 44, as shown in FIG. 2, for example. Each armrest shell 46, 48 includes a top wall 45, side walls 47, and an end wall 49. Top wall 45, side walls 47, and end wall 49 cooperate to define a cavity 50 formed to receive at least a portion of rear portion or lower back mounting section 30 of each respective side wall 22, 24 therein. Armrest shells 46, 48 and rear portions 30 cooperate to form armrests 52 of booster seat 10, as shown, for example, in FIGS. 1 and 2, provided for a juvenile to rest his or her arms thereon.

Apertures 36 of seat back 18 are formed through body 44 of lower back section 40 of seat back 18 to couple lower back section 40 to base 16. As mentioned above, lower back section 40 of seat 10 is coupled rigidly to base 16 to provide for little or no relative movement between lower back section 40 and base 16. Although base 16 and lower back section 40 of illustrative booster seat 10 are separate components, it is within the scope of this disclosure for base 16 and lower back section 40 to be formed as a single, unitary component of seat 10.

Body 44 of lower back section 40 includes a front or planar wall 54 having a substantially flat front surface 56 for a juvenile to rest his or her back against. Body 44 further includes a substantially flat rear surface 57, as shown in FIG. 4. A top wall 58 of body 44 is coupled to planar wall 54 as well as opposite side walls or side rails 60, 62 which are each coupled to planar wall 54 and top wall 58. As shown in FIGS. 3 and 4, side walls 60, 62 are further positioned to lie in spaced-apart relation to each other. Side walls 60, 62 and top wall 58 cooperate to define an outer rim of body 44 coupled to planar wall 54 and are positioned to extend in a rearward direction away from front surface 56 of planar wall 54. Support ribs 59 of lower back section 40 are coupled to and extend between top wall 58 and a bottom wall 61 of lower back section 40.

As shown in FIGS. 2–4, a pair of bar receivers 78 of height-adjustment mechanism 12 are provided in each side wall 60, 62 of body 44 of lower back section 40. Each bar receiver 78 includes a plurality of bar-receiving slots or notches 64 illustratively provided along a vertical length of each respective side wall 60, 62. As will be discussed in more detail below, each notch 64, or parallel set of notches 64, corresponds to a vertical height above bottom seat portion 20 to which headrest 14 of seat back 18 may be positioned to accommodate a particular child, for example. Notches 64 of height-adjustment mechanism 12 are provided to receive a separate portion of height-adjustment mechanism 12, specifically a height-adjustment bar 80, therein for adjusting and securing a height of headrest 14 above bottom seat portion 20 to accommodate small and large sized juveniles therein.

Height-adjustment bar 80 is provided to engage and disengage vertical bar receivers 78 to secure headrest 14 at a desired height above bottom seat portion 20. Although in the illustrative embodiment each bar receiver 78 is a respective side wall 60 or 62 appended to the body 44 of lower back section 40, it is within the scope of this disclosure to form or position the one or more bar receivers 78 at any suitable location on the booster seat 10.

Looking now to FIGS. 3 and 4, headrest 14 of seat back 18 includes a back plate 66 and first and second wing member 68, 70 coupled to opposite edges of back plate 66 and positioned to lie in spaced-apart relation to one another. Each wing member 68, 70 is oriented to lie at an angle relative to back plate 66, as shown in FIGS. 1–4, for example. Each wing member 68, 70 further includes a slot 71 formed to receive a shoulder strap portion (not shown) of a seat belt system (not shown) of the vehicle (not shown).

The up and down movement of headrest 14 relative to lower back section 40 functions to raise and lower headrest 14 above bottom seat portion 20 to adapt booster seat 10 to accommodate small-and large-sized juveniles. Headrest 14 moves up and down relative to base 16 and lower back section 40 to assure proper fit for a juvenile seated in booster seat 10. A caregiver can raise and lower headrest 14 to change the height of headrest 14 by operating height-adjustment mechanism 12. Height-adjustment mechanism 12 is coupled to headrest 14 and is described below in more detail. As shown in FIG. 4, a cover 42 is coupled to headrest 14 and maintained thereon by an elastic strap 43 extending across a back portion of headrest 14.

A portion of height-adjustment mechanism 12 of booster seat 10 operates to adjust the height of the headrest 14 relative to base 16. A portion of height-adjustment mechanism 12 is coupled to headrest 14 and receivable within notches or slots 64 formed in lower back section 40 to lock headrest 14 at a desired height above bottom seat portion 20 of base 16. Height-adjustment mechanism 12 includes a height-adjustment bar 80 positioned to lie along a width of headrest 14 and lower back section 40 illustratively below cover strap 43, as shown in FIG. 2, for example. Height-adjustment mechanism 12 further includes two actuators 82, 83 coupled to height-adjustment bar 80. Illustratively, each actuator 82, 83 is coupled to an outer end of bar 80 to position each actuator 82, 83 substantially on one side of the booster seat 10 (as shown in FIG. 1, for example) for side operation of the height-adjustment mechanism 12 by a user or caregiver. The positioning of the actuators 82 on either side of seat back 18 allows a user to actuate and move the height-adjustment bar 80 of the height-adjustment mechanism 12 from both the front and back side of the seat back 18. As is discussed in greater detail below, actuators 82, 83 operate to bias height-adjustment bar 80 to a locked position received within one pair of the slots 64 of the lower back section 40.

The actuators 82, 83 are identical to each other; therefore, reference is made only to the left actuator 82 shown in FIGS. 5–10. Actuator 82 includes an anchor mount 84 coupled to the headrest 14 of seat back 18. Illustratively, the anchor mounts 84 of each actuator 82, 83 are coupled to side wall portions 72, 74 of headrest 14. Each side wall portion 72, 74 is coupled to back plate 66 and extends generally in a direction away from a front surface 76 of back plate 66.

Actuator 82 further includes an outer cover 86 coupled to the anchor mount 84 and a push-button 88 positioned between the anchor mount 84 and outer cover 86 for sliding movement relative to both the outer cover 86 and anchor mount 84. A spring 90 is mounted between the push-button 88 and anchor mount 84 normally to bias the push-button 88 toward a locked position, described in more detail below. The push-button 88 of each actuator 82 is coupled to an end of the height-adjustment bar 80 such that the height-adjustment bar 80 is urged to move with each push-button 88 between a locked position where the height-adjustment bar is engaged with the slots 64 of the lower back section 40 an unlocked position where the height-adjustment bar is disengaged from the slots 64 of the lower back section 40. Spring 90 operates as a locking means for moving the push-button 88, and thus the height-adjustment bar 80 coupled to the push-button 88 to the locked position.

Figures 5, 6:
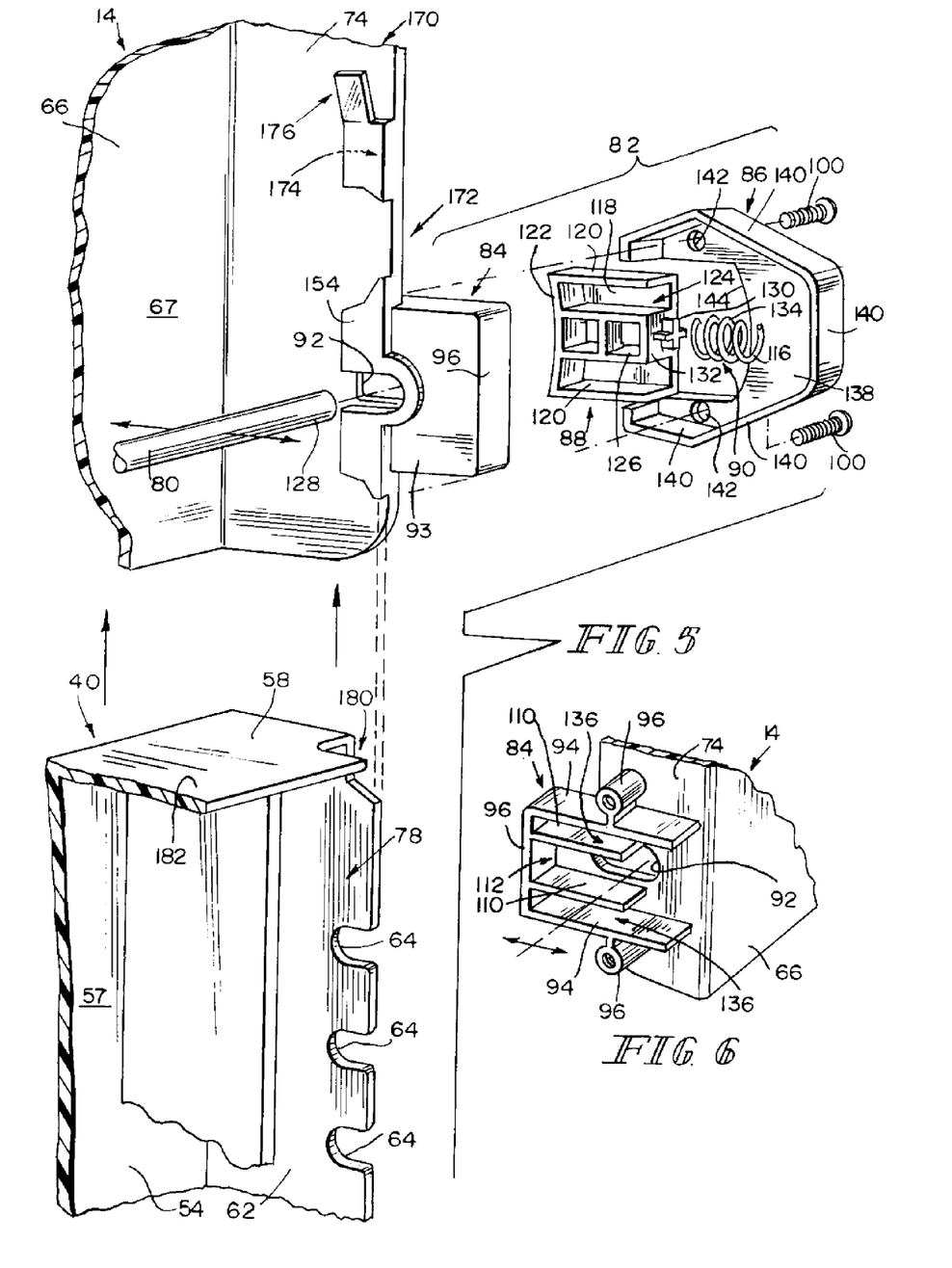
FIG. 5 is a rear perspective, exploded view of a portion of the headrest height-adjustment mechanism showing one of two actuators of the height-adjustment mechanism, the actuator including a mount rigidly coupled to the headrest of the seat back, an outer cover adapted to be coupled to the mount, a push-button, and a spring positioned substantially between the mount and the outer cover, and also showing a first end of a height-adjustment bar to be received within the actuator.
FIG. 6 is a perspective view of the mount shown in FIG. 5 (from another point of view) showing a slot for receiving a portion of the height-adjustment bar therethrough.

As mentioned above, each anchor mount 84, as better shown in FIG. 6, is coupled to one of the side wall portions 72, 74 of headrest 14. Anchor mount 84 and side wall portions 72, 74 each include a guide slot 92 formed to receive a portion or end of the height-adjustment bar 80 therethrough. Slot 92 is substantially oval or elliptically shaped to permit sliding back and forth movement of the height-adjustment bar 80 therein. Anchor mount 84 further includes an outer wall 93, opposite outer side walls 94 spaced-apart from each other, and an outer end wall 96 coupled to both side walls 94 and outer wall 93. A screw mount 96 is coupled to each of the outer side walls 94 and is provided to receive a screw 100 (shown in FIG. 5) therethrough to couple outer cover 86 to anchor mount 84.

Figure 9:
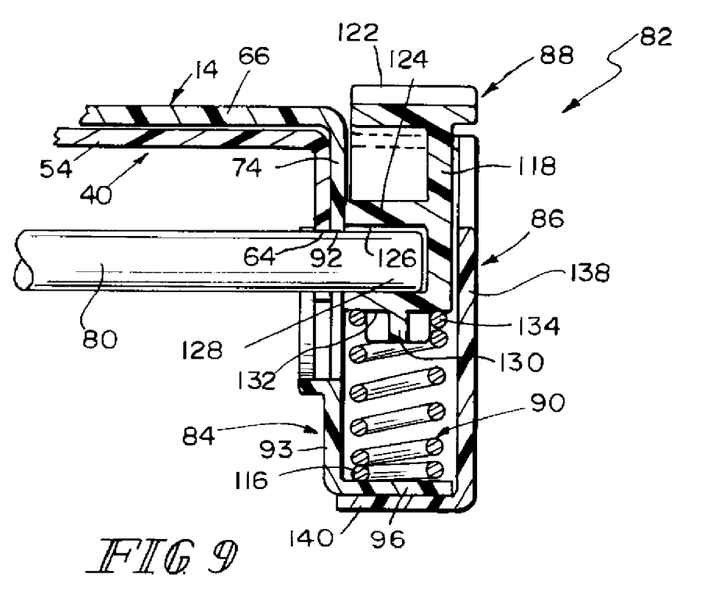
FIG. 9 is a top sectional view taken along line 9—9 of FIG. 7 showing the actuator in the locked position (as shown in FIG. 7, for example) such that the height-adjustment bar is received within one of the slots of the lower back section of the seat back.

A pair of inner side walls 110 of anchor mount 84 are each parallel to and spaced-apart from respective adjacent outer side walls 94. The inner side walls 110 are coupled to end wall 96. A spring-receiving channel 112 is formed between the inner side walls 110 to receive spring 90 therein. A first end 116 of spring 90 rests against an inside surface of end wall 96, as shown in FIGS. 9 and 10, for example. Although anchor mount 84 is described as being coupled to headrest 14, it is within this disclosure for anchor mount 84 and headrest 14 to be formed as a single, unitary component of booster seat 10. Anchor mount 82 includes a flange or lip member 154 coupled to outer wall 93 as shown in FIG. 5. Lip member 154 defines a slot or area between side wall portion 74 and lip member 154 for receiving a portion of respective side wall 62 of lower back section 40 therein.

Push-button 88 is generally square-shaped and includes a side or outer wall 118, opposite end walls 120 and a curved front wall 122. In operation, as is discussed below, a user engages curved front wall 122 to move push-button 88 against the bias of spring 90 from the normally locked position to an unlocked position to release height-adjustment bar 80 from within the slots 64 of lower back section 40. As shown in FIG. 5, push-button 88 further includes an inner member 124 coupled to outer wall 118 and formed to define an aperture or cavity 126 for receiving a portion of the height-adjustment bar 80 therein. Illustratively, an end portion 128 of the height-adjustment bar 80 is received therein for back and forth movement of the height-adjustment bar 80 with the push-button 88 of each actuator 82, 83. A spring mount 130 of push-button 88 is coupled to an outer surface of an end wall 132 of inner wall system 124 for mounting a second end 134 of spring 90 thereon.

Push-button 88 is received at least in part within anchor mount 84 such that first and second end walls 120 of push-button 88 are each positioned within a button-receiving space 136 between respective outer side walls 94 of anchor mount 84 and inner side walls 110 of anchor mount 84, as shown in FIG. 6. Spring 90 and at least a portion of inner member 124 are received within channel 112 of anchor mount 84. Cavity or aperture 126 of push-button 88 is generally aligned with slot 92 of anchor mount 84 such that end portion 128 of height-adjustment bar 80 is received through slot 92 and into cavity 126 for back and forth movement with push-button 88 within slot 92. Each spring 90 of actuators 82, 83 functions normally to bias height-adjustment bar 80 to a locked position in engagement with outer vertical bar anchor members or slots 64, as shown in FIGS. 7 and 9. Height-adjustment bar 80 is slidably movable within guide slots 92 in a generally horizontal direction relative to anchor mount 84 and outer cover 86 coupled to anchor mount 84.

Outer cover 86 of actuators 82, 83 includes an outer face plate 138 and side walls 140 appended thereto. Two apertures 142 are formed through outer face plate 138 and are each provided for receiving a screw 100 therethrough to couple outer cover 86 to anchor mount 84. As mentioned above, each screw 100 is received within one of the respective screw mounts 98 of actuator mount 86. Although outer cover 86 is coupled to anchor mount 84 through the use of screws 100, it is within the scope of this disclosure to couple the outer cover 86 to anchor mount 84 using other types of fasteners. Outer cover 86 includes a cut-out portion 144 provided to allow the user to see and engage a portion of the push-button 88 including the curved front wall 122 of push-button 88 as well as a portion of the outer wall 118 of push-button 88. As mentioned above, the components of actuator 82 are identical to the components of actuator 83; therefore, like reference numerals have been used throughout the drawings.

As is mentioned above, bar receivers 78 are provided in the side walls 60, 62 of lower back section 40 of seat back 18. However, it is within the scope of this disclosure to include other bar receivers provided in lower back section 40 of seat back 18. Further, it is within the scope of this disclosure to include only one set of vertical slots 64 provided in lower back section 40 or more than one set of vertical slots, such as the pair of bar receivers 78 shown herein. Each vertical bar receiver 78 is formed to include a plurality of panel height locators such as vertically spaced-apart bar-receiving slots 64 for receiving height-adjustment bar 80 therein to establish a fixed position of headrest 14 relative to the underlying bottom seat portion 20 of base 16. Height-adjustment bar 80 is received within one of the slots 64 when in the locked position.

As shown in FIG. 4, slot 150 is located to define the "lowest" position of the headrest 14 and slot 152 is located to define the "highest" position of headrest 14. Illustratively, seven slots are provided to provide for seven distinct positions of the headrest 14 above bottom seat portion 20 of base 16. It is within this disclosure, however, to provide any suitable number of panel height locators (or slots) for receiving the height-adjustment bar 80 therein to position the headrest 14 at any number of heights above bottom seat portion 20. Although only the outer slots of outer bar receivers 78 are provided, as shown in FIG. 4, it is within the disclosure to include an inner or centrally located panel of slots for receiving the height-adjustment bar 80 therein.

Illustratively, height-adjustment mechanism 12 includes actuators 82, 83 coupled to headrest 14, height-adjustment bar 80 coupled to actuators 82, 83, and bar receivers 78 including slots 64 for receiving height-adjustment bar 80 therein to secure headrest 14 at a certain height above bottom seat portion 20. Illustratively, the lower back section 40 of seat back 18 nests within the headrest 14, as shown in FIG. 2, such that a portion of each side wall 60, 62 of lower back section 40 is positioned to lie between side wall portions 72, 74 of headrest 14. Further, a portion of base 16 rests within lower back section 40 of seat back 18. Specifically, as mentioned above, rear portions 30 of base 16 are received within the cavities 50 of respective armrest shells 46, 48 and cooperate with armrest shells 46, 48 to form armrests 52 of booster seat 10.

The nesting of the lower back section 40 within the headrest 14 provides for a small offset distance between front surface 56 of lower back section 40 and front surface 76 of headrest 14 in order to provide a smooth and continuous seat back 18 for the juvenile seated within seat 10. A portion of planar front surface 56 of lower back section 40 engages a portion of rear planar surface 67 of headrest 14. Side walls 72, 74 of headrest 14, rear planar surface 67 of headrest 14, and a top wall 69 of headrest 14 cooperate to define an area or cavity formed to receive a portion of planar body 44 of lower back section 40 therein. Thus, top wall 98 and an upper portion of side walls 60, 62, and an upper portion of planar wall 54 of body 44 are received within the area of the headrest 14 defined by top wall 69, side wall portions 72, 74, and rear planar surface 67. Booster seat 10 includes, therefore, means for aligning headrest 14 to lower back section 40 to produce small offset 190 and allow movement of headrest 14 relative to lower back section 40.

In operation, a user 164 may depress push-button 88 against the bias of spring 90 of each actuator 82, 83 to disengage height-adjustment bar 80 from within one of the panel height locator slots 64 of the lower back section 40, as shown in FIGS. 8 and 10. Each push-button 88, therefore, provides means for moving the headrest to the unlocked position by allowing a user to move the each push-button 88, and thus the height-adjustment bar 80, against the bias of spring 90 to release the height-adjustment bar 80 from within one of the slots 64. As mentioned above, actuators 82, 83 are positioned at each end 128 of height-adjustment bar 80 such that each actuator 82, 83 is accessible by the user 164 from the front, back or side of booster seat 10.

Once height-adjustment bar 80 is disengaged from the panel height locator slots 56, the user may adjust the height of the headrest 14 up and down relative to the bottom seat portion 20. Once a desired height has been reached, the user may then release the push-button 88 of each actuator 82, 83. The bias of the each spring 90 will move each respective push-button 88 to the undepressed or unactivated position to also move the height-adjustment bar 80 therewith into engagement with one of the pair of slots 56 of the panel height locator slots.

As shown in FIGS. 7 and 9, height-adjustment mechanism 12 is in the locked position where height-adjustment bar 80 is received within a pair of the slots 64 of the bar receivers 78 and the push-button 88 is biased to the undepressed position by spring 90. As shown in FIG. 10, user 164 grasps actuator 82 and urges push-button 88 (and height-adjustment bar 80 coupled to push-button 88) against the bias of spring 90 to move push-button 88 in a generally horizontal direction away from lower back section 40 of seat back 18 to the release position. Illustratively, height-adjustment bar 80 moves within guide slot 92 of headrest 14 and anchor mount 84.

Once in the release position, as shown in FIGS. 8 and 10, user 164 may move actuators 82, 83 in a generally vertical direction up and down to move headrest 14 (coupled to actuators 82, 83) up and down in order to adjust the height of headrest 14 relative to bottom seat portion 20 of seat 10. Once headrest 14 is moved to the desired position, user 164 releases push-buttons 88 to allow springs 90 to bias each respective push-button 88 (and height-adjustment bar 80 coupled thereto) to the locked position within one of the slots 64 of outer vertical bar receivers 78.

Figure 15:
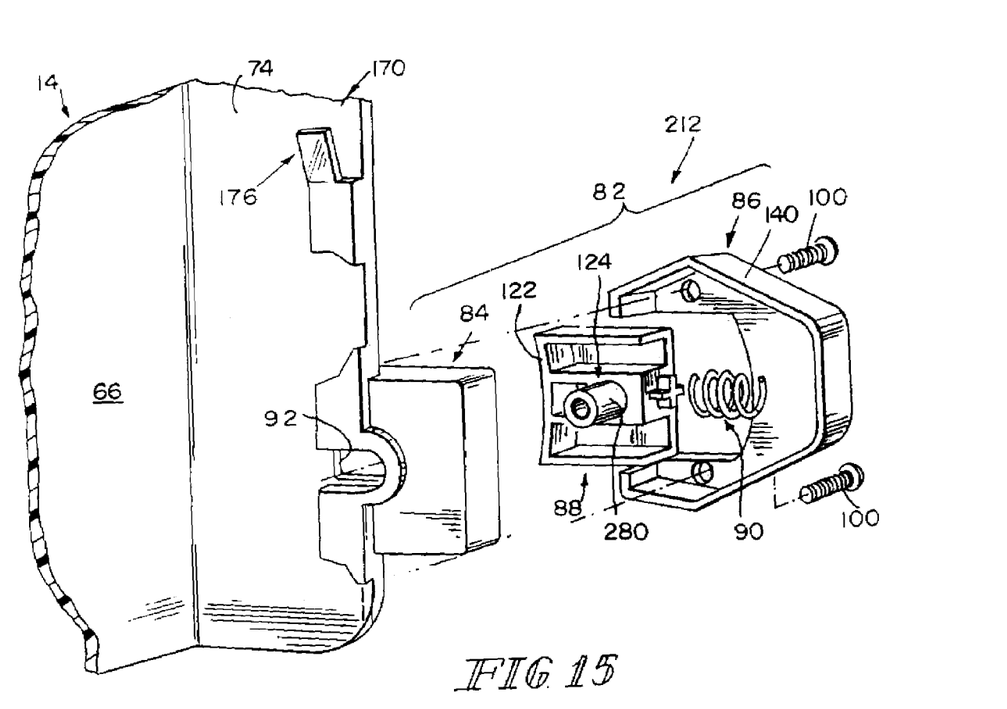
FIG. 15 is a rear perspective, exploded view similar to FIG. 5 showing a portion of an alternative height-adjustment mechanism including a bar or pin coupled to each actuator instead of the height adjustment bar shown in FIG. 5 and showing the bar of the alternative mechanism coupled to the push-button of the actuator to be received within the respective slots of the lower back section.
Figure 16:
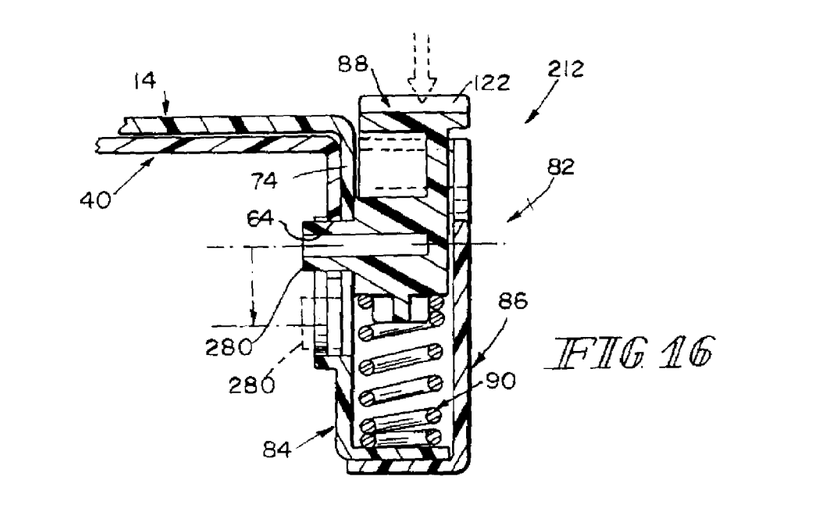
FIG. 16 is a sectional view similar to FIGS. 9 and 10 of the actuator and pin of the alternative height-adjustment mechanism showing the alternative bar of in the locked position received within one of the slots of lower back section.

Looking now to FIGS. 15 and 16, an alternative height adjustment mechanism 212 is provided. Alternative height-adjustment mechanism 212 is similar to height-adjustment mechanism 12 discussed above. Therefore, like reference numerals have been used to denote like components. For example, height-adjustment mechanism 212 includes actuators 82, 83 coupled to headrest 14, an alternative height-adjustment bar or pin 280 coupled to each actuator 82, 83, and bar receivers 78 including slots 64 for receiving respective height-adjustment bars 280 therein to secure headrest 14 at a certain height above bottom seat portion 20. As shown in FIGS. 15 and 16, alternative height-adjustment bar 280 is coupled to push-button 88 of actuator 82 to be received within bar receivers 78 in the locked position. As discussed above and shown in the figures, bar 80 of mechanism 12 is coupled at each end to the push-button 88 of the respective actuators 82, 83 and extends across headrest 14 between each actuator 82, 83. Alternative mechanism 212, on the other hand, includes two bars 280; each bar 280 is coupled to one of the actuators 82, 83. Bars 280 extend only partially across headrest 14 between actuators 82, 83. Illustratively, the height-adjustment bars or 280 of height-adjustment mechanism 212 operate in the same manner as height adjustment bar 80 described above. The term "bar", therefore, is intended to refer to both height-adjustment bar 80 of mechanism 12 and height-adjustment bar 280 of mechanism 212.

As mentioned above, booster seat 10 further includes an "anti-backout" feature or mechanism 170, best shown in FIGS. 5, and 11–14. The anti-backout mechanism 170 prevents a user from unintentionally raising the headrest 14 so high above bottom seat portion 20 so as to remove the headrest 14 from the lower back section 40. In other words, the anti-backout mechanism 170 prevents the user from removing the headrest 14 from the lower back section 40. The illustrative booster seat 10 includes two anti-backout mechanisms 170. A portion of each anti-backout mechanism 170 is coupled to headrest 14 and positioned to lie above each respective anchor mount 84. The features of only one anti-backout mechanism 170 are described herein. The other anti-backout mechanism 170 includes the same features and components, thus like reference numerals have been used.

As shown in FIG. 5, the anti-backout mechanism 170 includes a flange 172 coupled to side wall portion 74 of headrest 14. The flange (not shown) of the other anti-backout mechanism 170 is coupled to side wall portion 72 or headrest 14. Flange 172 is formed to define a channel 174 for receiving a portion of lower back section 40 therein. Specifically, channel 174 of flange 172 receives a portion of side wall 62 therein, as shown best in FIGS. 12 and 13. Illustrative flange 172 wraps around side wall 62 to align lower back section 40 with headrest 14 such that lower back section 40 nests within the back plate 66 and side wall portions 72, 74 of headrest 14. As headrest 14 moves up and down relative to lower back section 40 flanges 172 help maintain alignment between headrest 14 and lower back section 40.

Figures 13, 14:
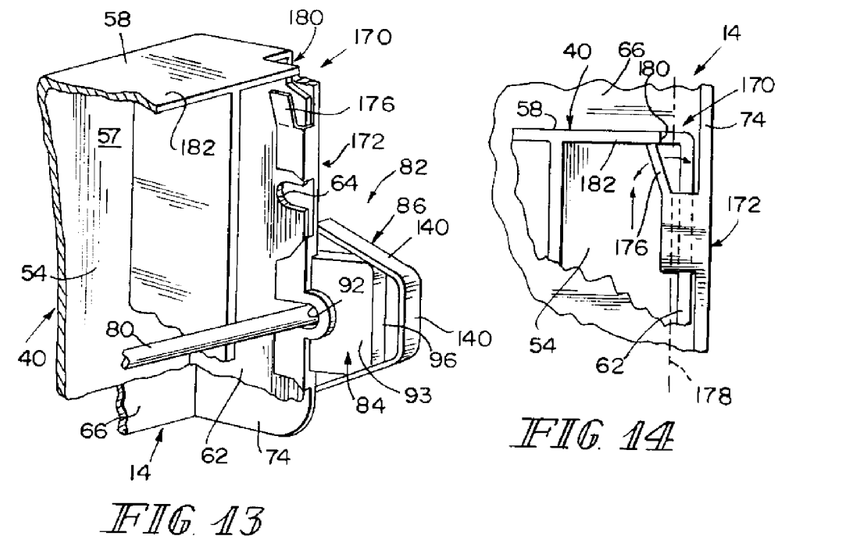
FIG. 13 is a rear perspective view similar to FIGS. 11 and 12 showing the headrest installed onto the lower back section.
FIG. 14 is a rear view of the anti-backout feature of the booster seat showing the anti-backout tab engaged with an upper lip portion of the lower back section of the seat back to prevent the user from further moving the headrest in an upward direction relative to the lower back section.

A tab 176 of anti-backout mechanism 170 is coupled to flange 172 and extends upwardly from flange 172, as shown in FIG. 5 and FIGS. 11–14. Tab 176 is positioned to lie at an angle offset from a vertical axis 178, as shown in FIG. 14. Tab 176 acts as a stop to prevent upward movement of headrest 14 relative to lower back section 40 beyond a certain point or elevation.

Each anti-backout mechanism 170 further includes a cut-out portion 180 of lower back section 40 formed where each side wall 60, 62 meets top wall 58 of lower back section 40. Cut-out portions 180 form a ledge 182 of top wall 58 therebetween.

Figures 11, 12:
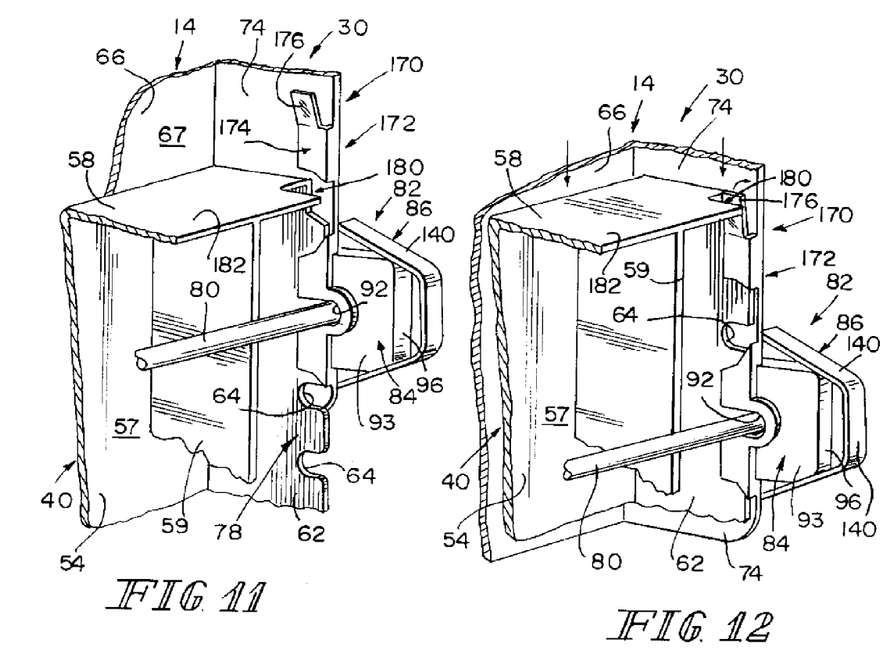
FIG. 11 is a rear perspective view of a portion of the booster seat showing the headrest being installed and lowered upon the lower back section of the seat back, and further showing an anti-backout tab of the headrest.
FIG. 12 is a rear perspective view similar to FIG. 11 showing the anti-backout tab of the headrest sliding past a cut-out of the lower back section as the headrest is being installed, or lowered, onto the lower back section.

Looking now to FIGS. 11–12, seatback 30 is assembled by sliding headrest 14 onto lower back section 40 such that lower back section 40 nests within side wall portions 72, 74 of headrest 14. As shown in FIGS. 11 and 12, headrest 14 is slid downwardly onto lower back section 40 such a portion of side wall portions 72, 74 are received within respective flanges 172 of anti-backout feature 170. Tab 176 is urged to slide through cut-out portion or corner notch 180 and may bend inwardly toward respective side wall portions 72, 74 as each tab 176 is urged through the notch 180. Once headrest 14 has been moved sufficiently downwardly onto lower back section 40 such that each tab 176 has slid fully past or through notch 180, each tab 176 springs back to the opened position.

In operation, anti-backout mechanism 170 operates to restrict upward movement of the headrest 14 relative to the lower back section 40 beyond a certain height in order to prevent a user from unintentionally removing headrest 14 from lower back section 40 where adjusting headrest 14 upwardly. As shown in FIG. 14, tab 176 engages a portion of ledge 182 near cut-out portion or notch 180 when headrest 14 has been moved upwardly to the maximum height above bottom seat portion 20. Tabs 176 thus act as stops or stoppers when engaging ledge 182 to prevent the user from raising headrest 14 any further.

If desired, however, a user may remove headrest 14 from lower back section 40 by pressing each tab 176 toward the respective side wall 60, 62 of the lower back section 40. By moving the tabs 176 to this vertical or closed position, the user is able to continue to slide the headrest 14 upwardly relative to lower back section 40 by sliding the closed tabs 176 through respective notches 180, as described above with respect to coupling the headrest 14 to the lower back section 40.

The invention claimed is:

1. A juvenile seat comprising
a base including a bottom seat portion,
a lower back section coupled to the base and positioned to lie at an angle relative to the bottom seat portion,
a headrest coupled to the lower back section for up and down movement relative to the base and the lower back section, the headrest including a back plate and first and second side wail portions coupled to the back plate and extending rearwardly therefrom and along substantially the entire length of the headrest back plate, and
a height-adjustment mechanism for adjusting a height of the headrest above the bottom seat portion, the height-adjustment mechanism including an actuator coupled to one of the first and second side wall portions of the headrest for up and down movement with the headrest, the actuator being arranged to move between a locked position to prevent up and down movement of the headrest relative to the lower back section and an unlocked position to permit up and down movement of the headrest relative to the lower back section.

2. The juvenile seat of claim 1, wherein the height-adjustment mechanism further includes a height-adjustment bar coupled to the actuator and bar receivers provided in the lower back section, and the height-adjustment bar is provided to engage the bar receivers in the locked position to secure the headrest at a desired height relative to the bottom seat portion and to disengage the bar receivers in the unlocked position.

3. The juvenile seat of claim 2, wherein the actuator is a first actuator, the juvenile seat further includes a second actuator, the first actuator is coupled to the first side wall portion of the headrest, and the second actuator is coupled to the second side wall portion of the headrest.

4. The juvenile seat of claim 3, wherein the height-adjustment bar includes a first end portion coupled to the first actuator and a second end portion coupled to the second actuator.

5. The juvenile seat of claim 3, wherein the height-adjustment bar is a first height-adjustment bar coupled to the first actuator and further including a second height-adjustment bar coupled to the second actuator.

6. The juvenile seat of claim 2, wherein the actuator includes an anchor member coupled to the one of the first and second side wall portions of the headrest, a push-button coupled to the height-adjustment bar and movable relative to the anchor member between the locked position and the unlocked position, and a spring coupled to the push-button to bias the push-button to the locked position where the height-adjustment bar is engaged with the bar receivers.

7. The juvenile seat of claim 6, wherein the lower back section includes a front wall and first and second side walls coupled to the front wall, and wherein the bar receivers are vertically-spaced slots formed within one of the first and second side walls to receive a portion of the height-adjustment bar therein.

8. The juvenile seat of claim 6, wherein the anchor member includes a guide slot formed to receive the height-adjustment bar therein to permit back and forth movement of the height-adjustment bar between the locked and unlocked positions.

9. The juvenile seat of claim 6, wherein the push-button is movable between the locked and unlocked positions along a first axis and the headrest is movable up and down relative to the base and the lower back section along a second axis perpendicular to the first axis.

10. The juvenile seat of claim 1, wherein the lower back section includes a front surface and the headrest is positioned adjacent the front surface of the lower back section.

11. The juvenile seat of claim 1, further comprising an anti-backout mechanism coupled to the headrest to limit the height of the headrest above the bottom seat portion of the base.

12. The juvenile seat of claim 11, wherein the anti-backout mechanism includes a stopper coupled to one of the first and second side wall portions of the headrest to engage a top wall of the lower back section.

13. A juvenile seat comprising
a base including a bottom seat portion,
a lower back section coupled to the base and positioned to lie at an angle relative to the bottom seat portion,
a headrest coupled to the lower back section for up and down movement relative to the base and the lower back section, the headrest including a back plate and first and second side wall portions coupled to the back plate,
a height-adjustment mechanism for adjusting a height of the headrest above the bottom seat portion, the height-adjustment mechanism including an actuator coupled to one of the first and second side wall portions of the headrest for up and down movement with the headrest, the actuator being arranged to move between a locked position to prevent up and down movement of the headrest relative to the lower back section and an unlocked position to permit up and down movement of the headrest relative to the lower back section,
further comprising an anti-backout mechanism coupled to the headrest to limit the height of the headrest above the bottom seat portion of the base,
wherein the anti-backout mechanism includes a stopper coupled to one of the first and second side wall portions of the headrest to engage a top wall of the lower back section, and
wherein the stopper is a tab positioned at an angle relative to a vertical axis along the side wall portion.

14. The juvenile seat of claim 13, wherein the tab is arranged to be moved between an opened, angled position engageable with the top wall of the lower back section and a closed, vertical position adjacent with the side wall portion of the headrest to pass through a notch formed in the lower back section.

15. A juvenile seat comprising
a base including a bottom seat portion,
a lower back section coupled to the base and positioned to lie at an angle relative to the bottom seat portion,
a headrest coupled to the lower back section for up and down movement relative to the base and the lower back section, the headrest including a back plate and first and second side wall portions coupled to the back plate,
a height-adjustment mechanism for adjusting a height of the headrest above the bottom seat portion, the height-adjustment mechanism including an actuator coupled to one of the first and second side wall portions of the headrest for up and down movement with the headrest, the actuator being arranged to move between a locked position to prevent up and down movement of the headrest relative to the lower back section and an unlocked position to permit up and down movement of the headrest relative to the lower back section,
further comprising an anti-backout mechanism coupled to the headrest to limit the height of the headrest above the bottom seat portion of the base,
wherein the anti-backout mechanism includes a stopper coupled to one of the first and second side wall portions of the headrest to engage a top wall of the lower back section, and
wherein the anti-backout mechanism further includes a flange coupled to one of the first and second side wall portions of the headrest, the flange is formed to define a channel for receiving a portion of the respective first or second side wall of the lower back section therein, and the stopper is coupled to the flange.

16. A juvenile seat comprising
a base including a bottom seat portion,
a lower back section coupled to the base and positioned to lie at an angle relative to the bottom seat portion,
a headrest coupled to the lower back section for up and down movement relative to the base and the lower back section, the headrest including a back plate and first and second side wall portions coupled to the back plate,
a height-adjustment mechanism for adjusting a height of the headrest above the bottom seat portion, the height-adjustment mechanism including an actuator coupled to one of the first and second side wall portions of the headrest for up and down movement with the headrest, the actuator being arranged to move between a locked position to prevent up and down movement of the headrest relative to the lower back section and an unlocked position to permit up and down movement of the headrest relative to the lower back section,
further comprising an anti-backout mechanism coupled to the headrest to limit the height of the headrest above the bottom seat portion of the base, and
wherein the anti-backout mechanism is positioned above the actuator of the height-adjustment mechanism.

17. A juvenile seat comprising
a base having a bottom seat portion,
a lower back section coupled to the base to lie at an angle to the bottom seat portion of the base,
a headrest coupled to the lower back section for up and down movement relative to the lower back section, the headrest being movable between a locked position prevented from moving up and down relative to the base and an unlocked position able to be moved up and down relative to the base, and
means for adjusting a height of the headrest above the base, the height-adjusting means being coupled to a side wall of the headrest to provide for side operation of the height-adjusting means, the side wall extending rearwardly from the headrest and along substantially the entire length of the headrest.

18. The juvenile seat of claim 17, wherein the height-adjusting means includes means for moving the headrest to the unlocked position and means for moving the headrest to the locked position, the means for moving the headrest to the unlocked position being coupled to the side wall of the headrest.

19. The juvenile seat of claim 18, wherein the means for moving the headrest to the locked position includes a plurality of vertically-spaced slots provided in the lower back section and a height-adjustment bar coupled to the means for moving the headrest to the unlocked position and biased to be received within the vertically-spaced slots in the locked position.

20. The juvenile seat of claim 19, wherein the means for moving the headrest to the locked position further includes a spring positioned to bias the height-adjustment bar into engagement with one of the vertically-spaced slots.

21. The juvenile seat of claim 19, wherein the means for moving the headrest to the unlocked position includes a push-button coupled to the height-adjustment bar to move the height-adjustment bar to the unlocked position disengaged from the vertically-spaced slots.

22. The juvenile seat of claim 17, wherein the side wall of the headrest is a first side wall and the headrest includes a second side wall, and wherein the height-adjusting means includes a first actuator coupled to the first side wall and a second actuator coupled to the second side wall, a first height-adjustment bar coupled to the first actuator and a second height-adjustment bar coupled to the second actuator, a plurality of vertically-spaced slots provided in the lower back section and formed to receive the height-adjustment bars therein in the locked position, and wherein the first and second actuators are movable between an locked position wherein the height-adjustment bars are each engaged with one of the vertically-spaced slots and a locked position where the height-adjustment bars are disengaged from the vertically-spaced slots.

23. The juvenile seat of claim 22, wherein each of the first and second actuators includes an anchor mount coupled to the headrest, a push-button coupled to the respective one of the first and second height-adjustment bars and movable relative to the respective anchor mount between the locked and unlocked positions, and a spring positioned to bias the respective push-button to the locked position.

24. The juvenile seat of claim 17, wherein the side wall of the headrest is a first side wall and the headrest includes a second side wall, and wherein the height-adjusting means includes a first actuator coupled to the first side wall and a second actuator coupled to the second side wall, a height-adjustment bar having a first end coupled to the first actuator and a second coupled to the second actuator, a plurality of vertically-spaced slots provided in the lower back section and formed to receive the height-adjustment bar therein in the locked position, and wherein the first and second actuators are movable between an locked position wherein the height-adjustment bar is engaged with one of the vertically-spaced slots and a locked position where the height-adjustment bar is disengaged from the vertically-spaced slots.

25. The juvenile seat of claim 24, wherein each of the first and second actuators includes an anchor mount coupled to the headrest, a push-button coupled to the height-adjustment bar and movable relative to the respective anchor mount between the locked and unlocked positions, and a spring positioned to bias the respective push-button to the locked position.

26. The juvenile seat of claim 17, further comprising means for preventing the headrest from being removed from the lower back section as the headrest is being moved upwardly relative to the lower back section.

27. A juvenile seat comprising a base having a bottom seat portion, a lower back section coupled to the base to lie at an angle to the bottom seat portion of the base, a headrest coupled to the lower back section for up and down movement relative to the lower back section, the headrest being movable between a locked position prevented from moving up and down relative to the base and an unlocked position able to be moved up and down relative to the base, means for adjusting a height of the headrest above the base, the height-adjusting means being coupled to a side wall of the headrest to provide for side operation of the height-adjusting means, further comprising means for preventing the headrest from being removed from the lower back section as the headrest is being moved upwardly relative to the lower back section, and wherein the preventing means includes a tab coupled to the side wall of the headrest, positioned at an angle relative to a vertical axis along the side wall of the headrest, and adapted to engage a top wall of the lower back section.

28. The juvenile seat of claim 27, wherein the tab is movable between an opened, angled position engageable with the top wall of the lower back section and a closed, vertical position adjacent with the side wall portion of the headrest to pass through a notch formed in the lower back section.

* * * * *